M. S. SPOTT AND T. JEFFREY.
AUTO WHEEL.
APPLICATION FILED AUG. 3, 1918.
1,307,277.
Patented June 17, 1919.
2 SHEETS—SHEET 2.
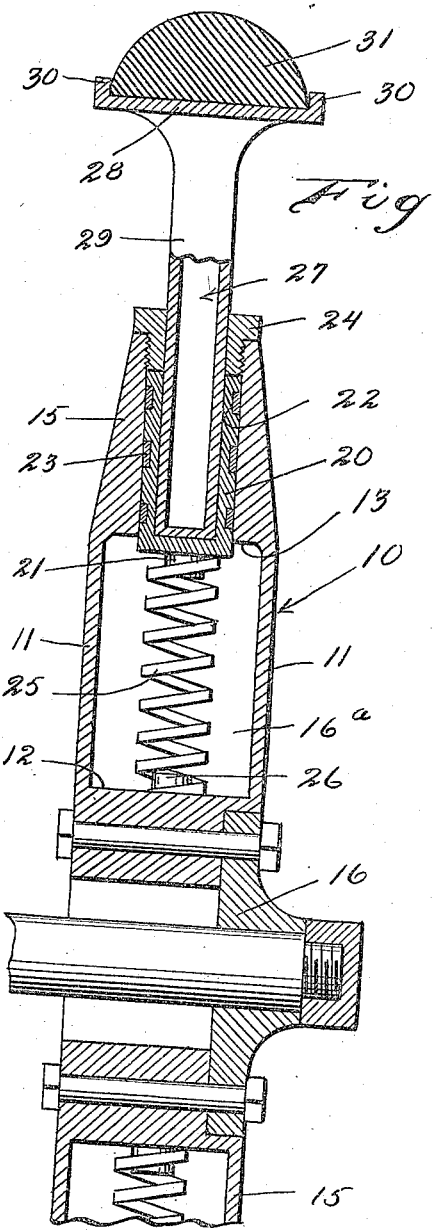
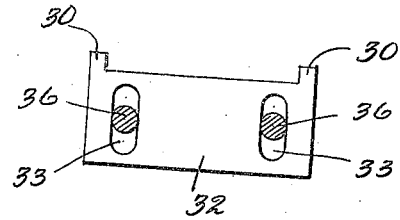
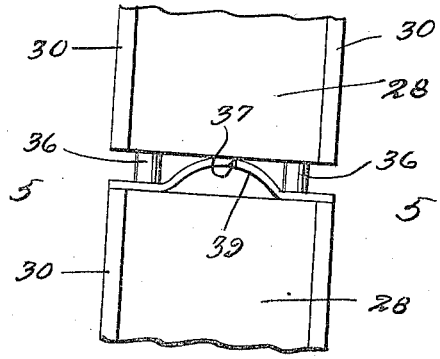
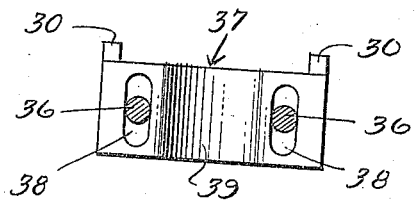
Inventors
Matthew S. Spott
Thomas Jeffrey
By Victor J. Evans
Attorney

UNITED STATES PATENT OFFICE.

MATTHEW S. SPOTT, OF SCRANTON, AND THOMAS JEFFREY, OF DUNMORE, PENNSYLVANIA.

AUTO-WHEEL.

1,307,277. Specification of Letters Patent. Patented June 17, 1919.

Application filed August 3, 1918. Serial No. 248,206.

*To all whom it may concern:*

Be it known that we, MATTHEW S. SPOTT and THOMAS JEFFREY, citizens of the United States, residing at Scranton and Dunmore, in the county of Lackawanna and State of Pennsylvania, have invented new and useful Improvements in Auto-Wheels, of which the following is a specification.

This invention relates to vehicle wheels, particularly to those of the resilient type, and has for its object the provision of a wheel upon which any desired form of cushion tire may be used and which is so constructed as to afford proper resilience during the course of travel of the wheel so that it will possess the advantages of a wheel equipped with a pneumatic tire while avoiding all possibility of punctures, blow-outs and the like.

An important object is the provision of a wheel of this character comprising a central reservoir portion in which may be disposed air under pressure, oil or other suitable fluid, and further comprising a plurality of plunger members having sliding movement into the fluid reservoir and having secured to the outer ends thereof spokes carrying shoes which coöperate with one another for forming a continuous rim upon which the tire is mounted.

Another object is the provision of a wheel of this character in which the spoke carried shoes are slidably and resiliently connected so that each spoke may have its proper movement without any danger of binding or other undesired action.

A further object is the provision of a wheel of this character in which the inward movement of the spoke members is opposed by a plurality of springs in addition to the resistance offered by the fluid within the reservoir.

An additional object is the provision of a wheel of this character which will be comparatively simple and inexpensive in manufacture, highly efficient in use, durable in service and a general improvement of the art.

With the above and other objects and advantages in view, the invention consists in the details of construction to be hereinafter more fully described and claimed, and illustrated in the accompanying drawing in which:—

Fig. 2 is a cross sectional view therethrough taken through one of the spokes.

Fig. 3 is a detail cross sectional view on the line 3—3 of Fig. 1.

Fig. 4 is a fragmentary plan view of the rim showing a slight modification, and

Fig. 5 is a detail sectional view therethrough.

Figure 1:
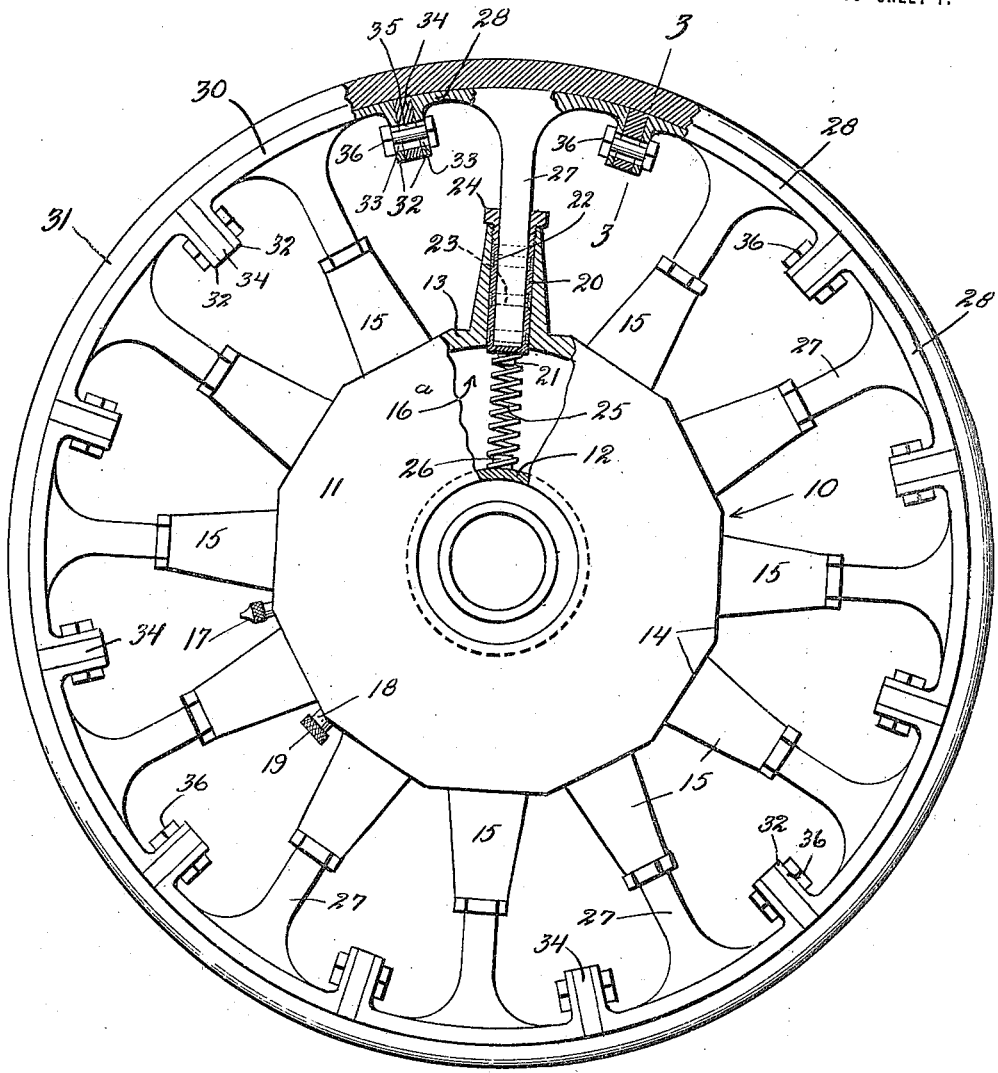
Figure 1 is an elevation of a wheel constructed in accordance with this invention, parts being broken away and in section.

Referring more particularly to the drawing the numeral 10 designates the relatively stationary portion of the wheel which is formed preferably as a single casting. This body portion 10 comprises a ring like reservoir portion including side walls 11, an inner cylindrical wall 12, and an outer wall 13 having its outer surface formed preferably as a plurality of angular faces 14 from which extend the radially disposed tubular guide members 15. Any desired form of hub 16 may be associated with the wheel in any suitable manner, one form of hub and one mode of connection being illustrated in Fig. 2 of the drawing.

The space defined between the walls 11, 12 and 13 is adapted to serve as a reservoir for compressed air or oil as may be preferred. In order that air may be admitted to this space, we provide any suitable or preferred type of inlet valve 17 extending through the outer wall 13 at any convenient location. As the inlet valve 17 might not properly permit the injection of oil, we provide an oil filling nipple 18 extending through the wall 13 at a point spaced from the inlet valve 17 and provided with a suitable closure cap 19.

Slidably disposed within each of the tubular guide members 15 is a plunger 20 which is preferably cylindrical in form and which has its inner end closed and its outer end open. Each plunger 20 is provided at its inner end with a reduced extension 21. The plungers 20 are provided upon their peripheries with grooves 22 within which are disposed suitable packing rings 23 whereby leak proof joints will be provided between the plungers and the inner walls of the tubular guides. In order that outward movement of the plungers 20 may be limited, we provide caps 24 threaded into the outer ends of the tubular members 15 and bearing against the outer ends of the plungers, the caps 24 being provided with openings of the same diameter as the internal diameter of the plungers.

The plungers 20 are normally urged into their outermost positions by means of a plurality of coiled springs 25 which have their outer ends engaging upon the reduced extensions 21 formed on the inner ends of the plungers, and which have their inner ends engaging upon similar lugs 26 extending from the wall 12.

The spokes are designated broadly by the numeral 27 and each comprises an arcuate plate or shoe 28 having formed thereon a cylindrical, and preferably hollow, shank 29. The shanks 29 of the spokes are engaged within the plungers 20, whereupon the arcuate plates or shoes 28 carried by the outer ends of the spokes will extend in circumferential alinement to form a rim. Each of the plates or shoes 28 is provided at its longitudinal edges with flanges 30 which form retaining means for any suitable form of tire. The tire is designated in the present instance by the numeral 31 and may be formed of solid rubber, leather or any other suitable material or may be even formed as a rope wound upon the rim formed by the plates 28, this detail not constituting an essential part of this invention.

Formed on the ends of the arcuate plates or shoes 28 are lugs 32 which extend inwardly in respect to the center of the wheel and which are provided with elongated slots 33. The plates or shoes 28 are of such length that when the wheel is assembled spaces will be provided between the lugs 32 on one plate and those on the next successive plates. In one form of the invention we have shown blocks 34 of rubber or other suitable material disposed within these spaces and provided with elongated slots 35 alining with the slots 33. Suitable bolts 36 pass through the slots 33 and 35 and hold the lugs 32 in secured relation with the blocks 34 interposed between them.

In the form of the invention shown in Figs. 4 and 5, instead of employing the blocks 34, we have shown spring members 37 having their end portions slotted as shown at 38 and having their central portions bowed as shown at 39. In this form of the invention, the spring members 37 take the place of the blocks 34 and are secured in position in identically the same manner.

In the use of a wheel constructed in accordance with this invention, it will be seen that as the weight of the vehicle is sustained by the successive spokes during travel of the wheel, the spoke sustaining the weight will be moved radially inwardly toward the center of the wheels as the associated plate or shoe 28 engages upon the ground. Owing to the provision of the slots 33 in the lugs 32 and the slots 35 in the resilient blocks 34 it will be seen that each spoke may move individually without in any way affecting the position of the adjacent spokes. Entirely regardless of whether the reservoir portion of the wheel contains oil, compressed air or other fluid, the inward movement of the spoke, and consequently the corresponding plunger 20, will be opposed by the oil or other fluid within the reservoir and will also be opposed on account of the provision of the springs 25. It will also be seen that on account of the slotted lugs and connecting blocks or the connecting spring as the case may be, the spokes may have free movement so that any binding action will be prevented. It will also be noted that if compressed air is used as the medium for filling the reservoir, the degree of resilience of the wheel may be varied by varying the air pressure.

From the foregoing description and a study of the drawings it will be apparent that we have thus provided a resilient wheel the parts of which may be readily and easily removed and replaced in case of wear or breakage, which will afford the maximum degree of resilience during use, and which eliminates the annoyances caused by punctures and blow-outs by avoiding the use of a pneumatic tire.

While we have shown and described the preferred embodiment of the invention it will of course be readily understood that we reserve the right to make such changes in the form, construction and arrangement of parts as will not depart from the spirit of the invention nor the scope of the subjoined claims.

Having described the invention what is claimed is:—

A resilient wheel comprising a hollow central body, a plurality of tubular guide members extending radially from said body, plungers slidable within said tubular guide members and having closed inner ends, caps threaded into the outer ends of said tubular guide members for limiting the outward movement of said plungers, means within said hollow body for opposing inward movement of said plungers, spokes slidable through said caps and disposed within said plungers with their inner ends in abutting engagement with the closed ends thereof, arcuate plates formed on the outer ends of said spokes and arranged in circumferential alinement to form a rim and flexible connections between said plates.

In testimony whereof we affix our signatures.

MATTHEW S. SPOTT.
THOMAS JEFFREY.

Copies of this patent may be obtained for five cents each, by addressing the "Commissioner of Patents, Washington, D. C."